US012692933B2

(12) United States Patent
Halpin et al.

(10) Patent No.: US 12,692,933 B2
(45) Date of Patent: Jul. 28, 2026

(54) ANTI BACKLASH ADJUSTMENT MECHANISM FOR GEARS

(71) Applicant: Helios Technical Services, LLC, Cave Creek, AZ (US)

(72) Inventors: Mike Halpin, Cave Creek, AZ (US); Steve Burch, Scottsdale, AZ (US)

(73) Assignee: Helios Technical Services, LLC, Cave Creek, AZ (US)

( * ) Notice: Subject to any disclaimer, the term of this patent is extended or adjusted under 35 U.S.C. 154(b) by 0 days.

(21) Appl. No.: 18/907,273

(22) Filed: Oct. 4, 2024

(65) Prior Publication Data

US 2025/0116323 A1    Apr. 10, 2025

Related U.S. Application Data

(60) Provisional application No. 63/542,461, filed on Oct. 4, 2023.

(51) Int. Cl.
*F16H 55/18* (2006.01)
*F16H 57/022* (2012.01)
*F16H 57/12* (2006.01)

(52) U.S. Cl.
CPC ............. *F16H 55/18* (2013.01); *F16H 57/12* (2013.01); *F16H 2057/0224* (2013.01)

(58) Field of Classification Search
CPC . F16H 1/26; F16H 55/18; F16H 57/12; F16H 2057/125; F16H 2057/0224
See application file for complete search history.

(56) References Cited

U.S. PATENT DOCUMENTS 9,200,700 B2 * 12/2015 Kessler ................. F16H 57/022

FOREIGN PATENT DOCUMENTS

EP         0417508 B1 * 10/1993   ............. F16H 57/12
JP      2007290683 A * 11/2007   ............... B62D 5/22

* cited by examiner

*Primary Examiner* — Bobby Rushing, Jr.
(74) *Attorney, Agent, or Firm* — Galvani Smith PLLC

(57)                ABSTRACT

A gear box may have a housing and a driving shaft with a gear and a driven shaft with a gear. The shafts may be rotatably mounted in the housing and positioned so that the driving shaft gear meshes, i.e., is in operable position, with the driven shaft gear. An eccentric bearing adjust may be positioned to surround a part of the driving shaft (or a part of the driven shaft). A first and second tip set screws may be positioned in the housing in operable position to the eccentric bearing adjust. The first and second tip set screws are configured to rotate the eccentric bearing which moves a center position of the driving shaft (or a center position of the driven shaft) when the screws are tightened or loosened. Rotating and calibrating the eccentric bearing adjust mitigates any backlash between the driving shaft gear and the driven shaft gear.

14 Claims, 6 Drawing Sheets

500, 600

500, 600

500, 600

500, 600

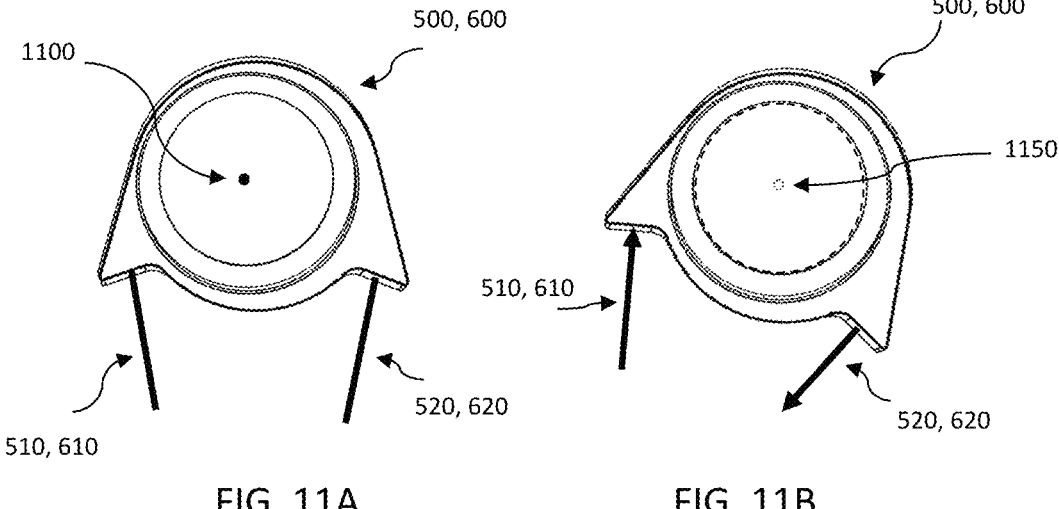
FIG. 11A                    FIG. 11B
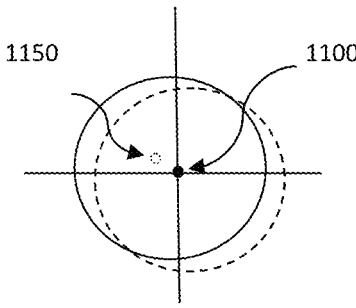
FIG. 12

ANTI BACKLASH ADJUSTMENT MECHANISM FOR GEARS

CROSS-REFERENCE TO RELATED APPLICATIONS

This application claims the benefit of U.S. Provisional Application No. 63/542,461, filed on Oct. 4, 2023, the contents of which is incorporated herein by reference in its entirety.

FIELD OF THE INVENTION

The present invention relates to a mechanism for mitigating backlash between gears by adjusting a center of a driving and/or a driven shaft. More specifically, the disclosure relates to an eccentric anti backlash adjustment mechanism that may finely adjust a center of a driving and/or driven shaft to remove gaps between gears thereby mitigating backlash.

BACKGROUND

Backlash (also known as slop, lash, or play) is a lost motion in a mechanical system caused by gaps or a clearance between gear teeth. Backlash may be defined as the maximum distance or angle through which any part of a mechanical system may be moved in one direction without applying appreciable force or motion to the next part in a mechanical sequence. Backlash may be seen when the direction of movement is reversed, and the slack or lost motion is taken up before the reversal of motion is complete.

Backlash may be harmful to a mechanical system as it may impart a sudden hard striking force between the gear teeth when the mechanical system is reversed in direction thereby causing the gear teeth to wear out faster. The striking force between the gear teeth may also cause particles to be created from the gear teeth which may contaminate the environment of the mechanical system.

Backlash may also cause a jerky motion on the driven shaft every time the mechanical system is reversed. Specifically, there may be a pause on the driven shaft as the driving shaft reverses and starts to accelerate in the new direction taking up the gap between the gear teeth. Once the gap is gone, the driven shaft may experience a jerky motion as the driven shaft has to jerk to catch up to speed with the driving shaft. What is needed is an anti backlash adjustment mechanism that mitigates the amount of backlash experienced by gears.

SUMMARY OF THE INVENTION

Accordingly, the invention is directed to a backlash mitigation device that improves the performance of gears by allowing the gears to be finely adjusted to remove unnecessary gaps between gears during calibration.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The present invention is directed to an apparatus for reducing backlash between gears in a gear box. In an example embodiment, a gear box may have a gear box housing that provides much of the strength and stability for the gear box and forms an outer shell for the gear box.

The gear box may also have a driving shaft having a driving shaft gear. The driving shaft may be rotatably mounted in the gear box. The gear box may also have a first driven shaft having a first driven shaft upper gear and a second driven shaft lower gear. The first driven shaft may be rotatably mounted in the gear box so that the first driven shaft upper gear is in operable position with the driving shaft gear.

The gear box may also have a second driven shaft having a second driven shaft gear. The second driven shaft may be rotatably mounted in the gear box so that the second driven shaft gear is in operable position with the first driven shaft lower gear.

The gear box may also have a first eccentric bearing adjust positioned so as to surround at least a portion of the driving shaft. A first tip set screw and a second tip set screw may be positioned in the gear box housing in operable position juxtaposed next to the first eccentric bearing adjust. The first tip set screw and the second tip set screw may be configured to calibrate a center position of the driving shaft by rotating the first eccentric bearing to mitigate backlash between the driving shaft gear and the first driven shaft gear.

The gear box may also have a second eccentric bearing adjust positioned so as to surround at least a portion of the second driven shaft. A third and a fourth tip set screw may be positioned in the gear box housing in operable position juxtaposed next to the second eccentric bearing adjust. The third tip set screw and the fourth tip set screw may be configured to calibrate a center position of the second driven shaft by rotating the second eccentric bearing to mitigate backlash between the first driven shaft lower gear and the second driven shaft gear.

While the above example embodiment had one driving and two driven shafts and gears, the invention may be used with any number of driving and driven shafts and gears.

In some embodiments the first driven shaft may be rotatably about its length axis but is otherwise fixed to the gear box housing.

In some embodiments the first and second eccentric bearing adjust have a circular cavity for receiving the at least the portion of the driving shaft.

In some embodiments, the circular cavity of the first and second eccentric bearing adjust has an original center point that moves to an adjusted center point at a different position than the original center point by tightening and loosening the first tip set screw and the second tip set screw.

In some embodiments, a center point of the circular cavity of the first and second eccentric bearing adjusts may be offset from a center point of the eccentric bearing adjust. This moves a shaft inside the eccentric bearing adjust when the tip set screws for the eccentric bearing adjust are tightened or loosened. The movement of the shaft in the eccentric bearing adjust by the two tip set screws may be used to calibrate the location of the gears to mitigate or eliminate the backlash of the gears.

In some embodiments, the first and second eccentric bearing adjust has a first flat surface for coming into contact with the first tip set screw and a second different flat surface for coming into contact with the second tip set screw.

In some embodiments, a center point of the circular cavity of the eccentric bearing adjust is offset from a pivot point of the first and the second eccentric bearing adjusts. The pivot point in this context is defined by the point where the first or second eccentric bearing adjust is pivoted around when the first tip set screw and the second tip set screw are tightened and loosened.

This Summary section is neither intended to be, nor should be, construed as being representative of the full extent and scope of the present disclosure. Additional benefits, features and embodiments of the present disclosure are set forth in the attached figures and in the description hereinbelow, and as described by the claims. Accordingly, it should be understood that this Summary section may not contain all of the aspects and embodiments claimed herein.

Additionally, the disclosure herein is not meant to be limiting or restrictive in any manner. Moreover, the present disclosure is intended to provide an understanding to those of ordinary skill in the art of one or more representative embodiments supporting the claims. Thus, it is important that the claims be regarded as having a scope including constructions of various features of the present disclosure insofar as they do not depart from the scope of the methods and apparatuses consistent with the present disclosure (including the originally filed claims). Moreover, the present disclosure is intended to encompass and include obvious improvements and modifications of the present disclosure.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 11A represents an eccentric bearing adjust in a starting state;

FIG. 11B represents the eccentric bearing adjust in FIG. 11A after being adjusted, moved or calibrated;

FIG. 12 represents a diagram showing how the center of the shaft was moved from the starting position in FIG. 11A to the adjusted position in FIG. 11B.

4

DETAILED DESCRIPTION OF THE ILLUSTRATED EMBODIMENTS

Figures 1, 2, 3, 4:
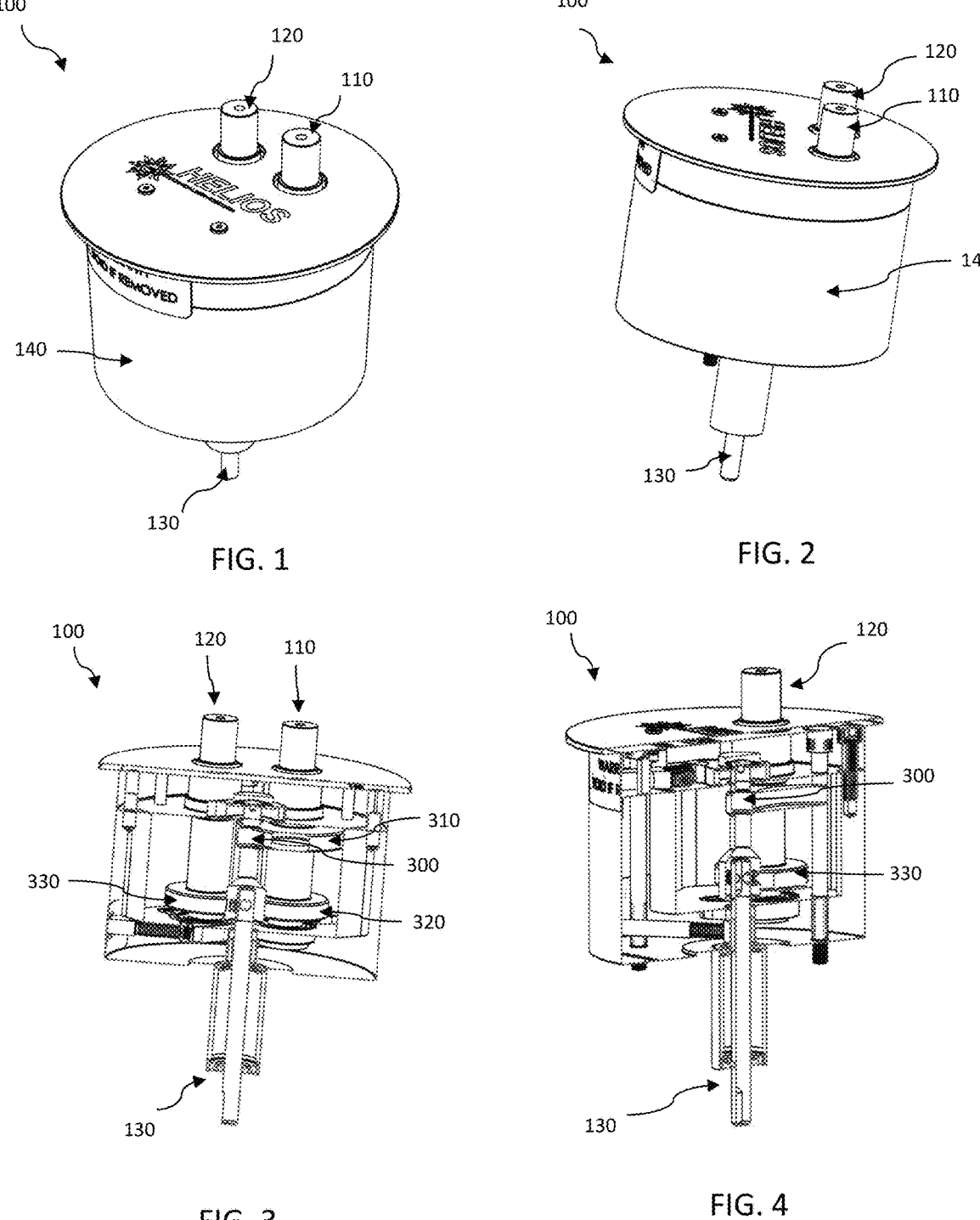
FIG. 1 is a side perspective view of a gear box arranged in accordance with the present design.
FIG. 2 is a side perspective view of the gear box illustrated in FIG. 1.
FIG. 3 is a front vertical cross-sectional view of the gear box illustrated in FIG. 1.
FIG. 4 is a side vertical cross-sectional view of the gear box illustrated in FIG. 1.

The following detailed description describes an anti backlash adjust mechanism for gears, method of using and making the same and is presented to enable any person skilled in the art to make and use the disclosed subject matter in the context of one or more particular implementations. Various modifications, alterations, and permutations of the disclosed implementations can be made and will be readily apparent to those skilled in the art, and the general principles defined may be applied to other implementations and applications, without departing from scope of the disclosure. The present disclosure is not intended to be limited to the described or illustrated implementations, but to be accorded the widest scope consistent with the described principles and features.

For the purposes of promoting an understanding of the principles of the present disclosure, reference will now be made to the exemplary embodiments illustrated in the drawing(s), and specific language will be used to describe the same.

Appearances of the phrases an "embodiment," an "example," or similar language in this specification may, but do not necessarily, refer to the same embodiment, to different embodiments, or to one or more of the figures. The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps unless explicitly stated otherwise.

Backlash (also known as slop, lash, or play) is a lost motion in a mechanical system caused by gaps or a clearance between the teeth of gears. Backlash may be defined as the maximum distance or angle through which any part of a mechanical system may be moved in one direction without applying appreciable force or motion to the next part in a mechanical sequence. Backlash may be seen when the direction of movement of gears is reversed, and the slack or lost motion is taken up before the reversal of motion of the gears is complete.

Backlash may be harmful to a mechanical system as it may impart a sudden jerking motion or hard striking force between the teeth of the gears when the mechanical system is reversed in direction. The jerking and striking force may cause the gear teeth to wear out faster and may also cause particles to be created which may contaminate the environment of the mechanical system.

Backlash may also cause a jerky motion on the driven shaft every time the mechanical system is reversed. Specifically, there may be a pause on the driven shaft as the driving shaft 130 reverses directions (clockwise to counterclockwise or counterclockwise to clockwise) and starts to accelerate in the new direction taking up the gap between the gear teeth. Once the gap is gone, the driven shaft may experience a jerky motion as the driven shaft has to jerk to catch up to speed with the driving shaft 130. What is needed is an anti backlash adjustment mechanism that allows the driving shaft 130 and/or driven shaft to be properly positioned (calibrated) to mitigate the amount of backlash experienced by gears.

Reference will now be made in detail to an embodiment of the present invention, examples of which are illustrated in the accompanying drawings.

FIGS. 1 and 2 illustrate an example gear box 100 incorporating the claimed invention. In the illustrated example, the gear box 100 has a gear box housing 140 with a driving shaft 130, a first driven shaft 110 and a second driven shaft 120. It should be appreciated that the anti backlash apparatus of the present invention may be used in gear boxes with any desired number of driving shafts and any desired number of driven shafts. Each driving shaft and driven shaft may have one or more gears. In addition, the anti backlash apparatus of the present invention may be used with gears of any size or shapes and the gears may be made of any desired material that can handle the applied forces. Gears, as non-limiting examples, may be made of iron-based materials, nonferrous metals, brass, bronze, aluminum, aluminum alloys, ceramics, plastics, 3D printer ink or resins preferably selected based on the applied forces and loads placed on the gears.

FIGS. 3 and 4 illustrate vertical cross-section views of the example gear box 100 shown in FIGS. 1 and 2. This example gear box 100 may have a single driving shaft 130 with a driving shaft gear 300. The driving shaft 130 may be rotatably mounted in the gear box 100. The gear box 100 may also have a first driven shaft 110 having a first driven shaft upper gear 310 and a first driven shaft lower gear 320. The driving shaft gear 300 may be positioned in this embodiment in an operable position near or juxtaposed to the first driven shaft upper gear 310. The gear box 100 may also have a second driven shaft 120 having a second driven shaft gear 330. The first driven shaft lower gear 320 may be positioned in this embodiment in an operable position near or juxtaposed to the second driven shaft gear 330.

As illustrated in FIGS. 1-4 and as described above, as the first driving shaft 130 is turned, preferably by a motor that is not shown and that is not part of this embodiment, the first driving shaft gear 300 engages with the first driven shaft upper gear 310 to turn the first driven shaft 110 in the opposite direction that the first driving shaft 130 is turning. In turn, the first driven shaft lower gear 320 engages with the second driven shaft gear 330 to turn the second driven shaft 120 in the opposite direction of the first driven shaft 110, but the same direction as the driving shaft 130. This is merely an example embodiment to explain how the anti backlash mechanism works in practice. Other configurations of driving shaft(s) and driven shaft(s) may also use the anti backlash mechanism of the present invention.

It should be understood that when reference is made in this specification and claims to gears being near each other, juxtaposed with each other, next to each other, in operable position to each other or some other similar language, this means that the teeth of the gears will engage with each other and overlap so that a gear rotating on one shaft will rotate a neighboring gear on another shaft.

Figure 5:
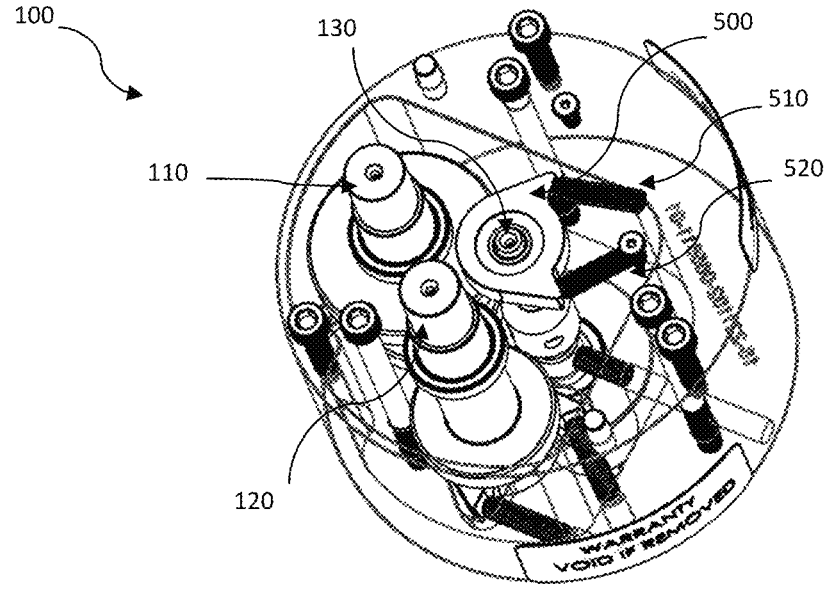
FIG. 5 is a top plan view illustrating an eccentric bearing adjust for a driving shaft.

FIG. 5 is a top plan view illustrating a first eccentric bearing adjust 500 that may be used to calibrate a position for the driving shaft 130. A first set screw and a second set screw may be used to adjust the position of the driving shaft 130 and the driving shaft gear 300.

Figure 6:
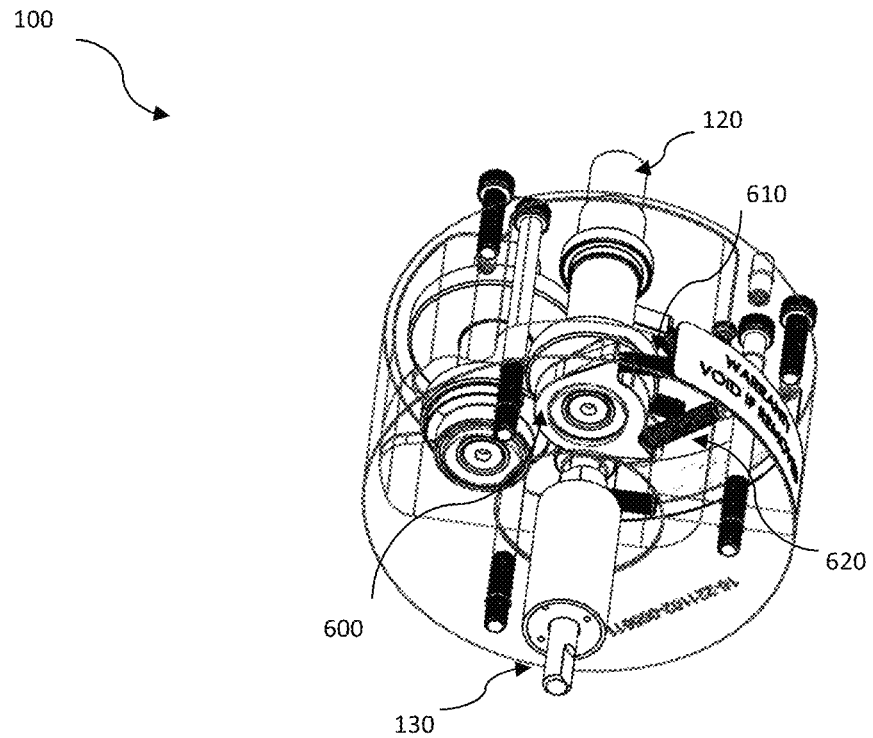
FIG. 6 is a bottom plan view illustrating an eccentric bearing adjust for a first driven shaft.

FIG. 6 is a bottom plan view illustrating a second eccentric bearing adjust 600 that may be used to calibrate a position for the second driven shaft 120. A third set screw and a fourth set screw may be used to adjust the position of the second driven shaft 120 and the second driven shaft gear 330.

In the embodiment illustrated in FIGS. 5 and 6, the first driven shaft 110 is rotatably fixed within the gear box 100 and does not need to be moved, adjusted or calibrated as the other two shafts (driving shaft 130 and second driven shaft 120) may be moved, i.e. calibrated, in relation to the fixed position of the first driven shaft 110 and the first driven shaft gear. The first driven shaft 110 in this embodiment illustrates that not all shafts and shaft gears in a gear box 100 need to be adjustable with an eccentric bearing adjust to mitigate or eliminate backlash within the gear box 100.

Figure 7:
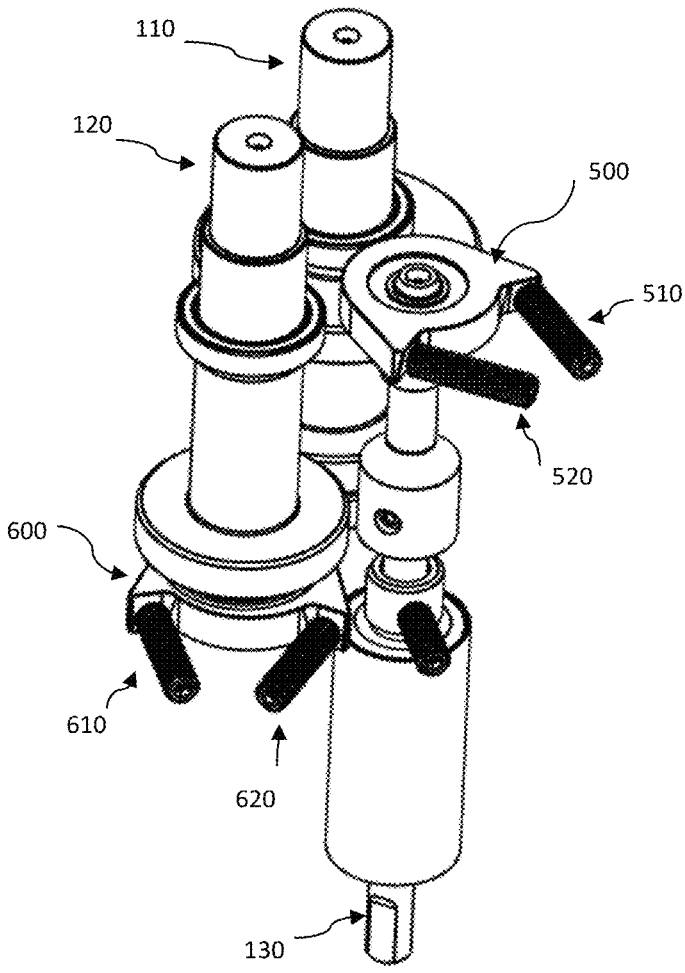
FIG. 7 is a perspective view of the driving shaft, first driven shaft, second driven shaft, first eccentric bearing adjust for the driving shaft and a second eccentric bearing adjust for the second driven shaft.

FIG. 7 is a perspective view of the driving shaft 130, the first driven shaft 110, the second driven shaft 120, the first eccentric bearing adjust 500 for the driving shaft 130, the first tip set screw 510, the second tip set screw 520, the second eccentric bearing adjust 600 for the second driven shaft 120, the third tip set screw 530 and the fourth tip set screw 540. FIG. 7 illustrates an example of how a plurality of eccentric bearing adjusts may be used within a gear box 100 to adjust a plurality of driving shafts and driven shafts.

Figure 8A:
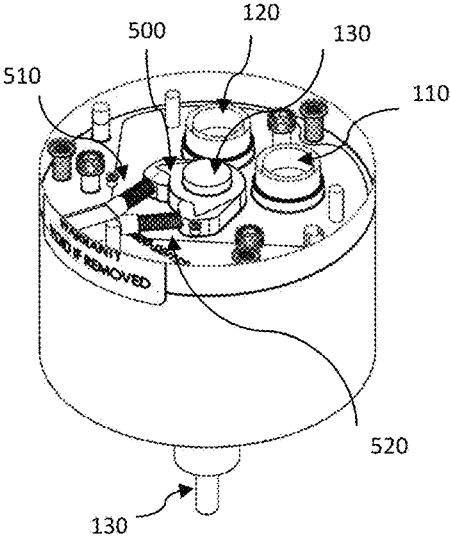
FIG. 8A is a horizontal cross-sectional view of the first eccentric bearing adjust for the driving shaft.
Figure 8B:
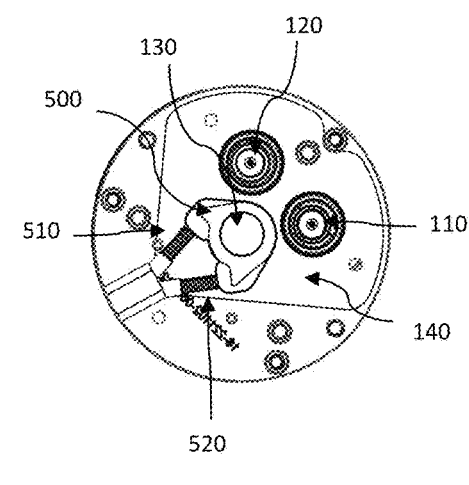
FIG. 8B is a top horizontal cross section view of the first eccentric bearing adjust for the driving shaft.
Figure 9A:
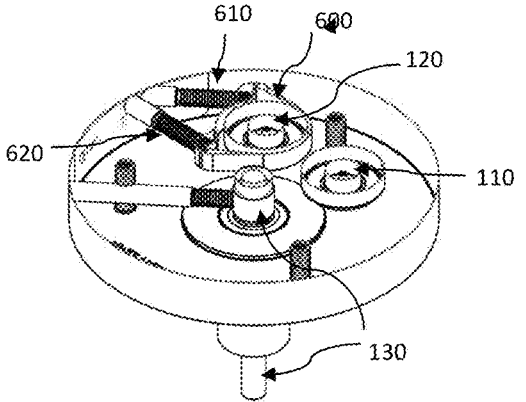
FIG. 9A is a horizontal cross-sectional view of the eccentric bearing adjust for the second driven shaft.
Figure 9B:
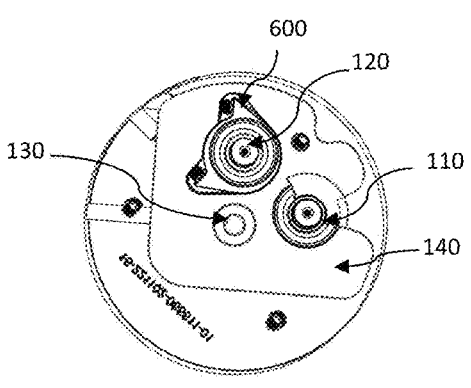
FIG. 9B is a top horizontal cross-sectional view of the second eccentric bearing adjust for the second driven shaft.
Figure 10A:
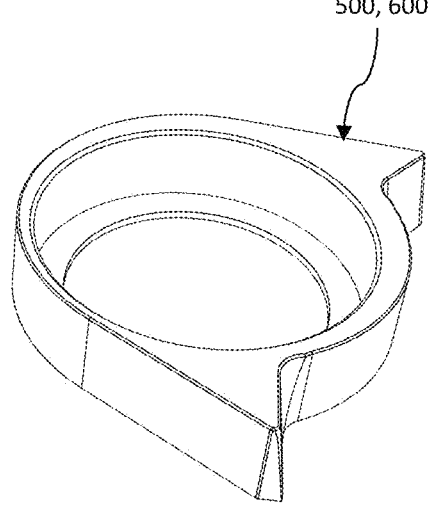
FIGS. 10A, 10B, 10C and 10D are various perspective views of an eccentric bearing adjust.
Figure 10B:
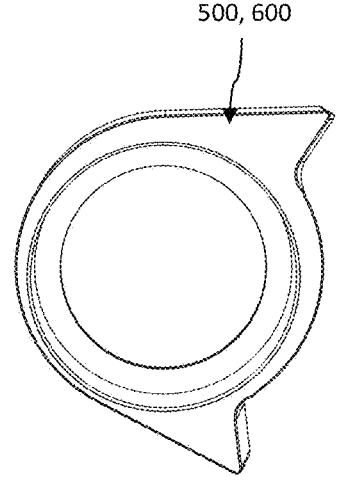
Figure 10C:
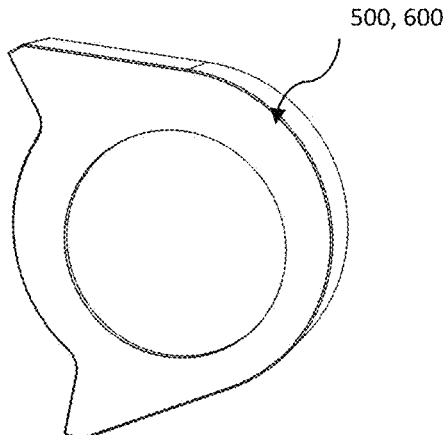
Figure 10D:
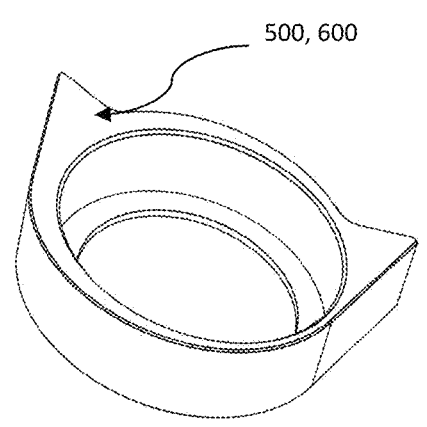

FIG. 8A is a horizontal cross-sectional view of the first eccentric bearing adjust 500 for the driving shaft 130. FIG. 8B is a top horizontal cross section view of the first eccentric bearing adjust 500 for the driving shaft 130. FIG. 9A is a horizontal cross-sectional view of the second eccentric bearing adjust 600 for the first driven shaft 110. FIG. 9B is a top horizontal cross-sectional view of the second eccentric bearing adjust 600 for the second driven shaft 120.

FIGS. 8B and 9B show examples of how the first eccentric bearing adjust 500 and the second eccentric bearing adjust 600 must be limited in movement by the gear box housing 140 or other components in the gear box housing 140. The eccentric bearing adjust needs a structure in the gear box 100 to hold the eccentric bearing adjust in place, but allowing the eccentric bearing adjust to rotate, turn, twist, pivot or be calibrated in place. The structure may be a cutout or slot in the gear box housing 140 or another piece with a cutout for holding the eccentric bearing adjust added to the gear box 100. The first tip set screw 510 and the second tip set screw 520 must be able to adjust, calibrate, rotate, turn or pivot the first eccentric bearing adjust 500 in a very controlled manner while prohibiting all other motions of the first eccentric bearing adjust 500. Likewise, the second tip set screw 520 and the fourth tip set screw 540 must be able to adjust, calibrate, rotate, turn or pivot the second eccentric bearing adjust 600 in a very controlled manner while prohibiting all other motions of the second eccentric bearing adjust 600. In other words, the gear box housing 140 or mechanisms within the gear box housing 140 must constrain the movements of the first eccentric bearing adjust 500 and the second eccentric bearing adjust 600 while still permitting the first eccentric bearing adjust 500 and the second eccentric bearing adjust 600 to be adjusted, calibrated, rotated, turned or pivoted. The gear box housing 140 may accomplish this by having cutouts or places for the eccentric bearing adjusts to be placed in that allow the eccentric bearing adjusts to be slightly rotated by two tip set screws, but otherwise constrained in movement.

FIGS. 10A, 10B, 10C and 10D are various perspective views of an eccentric bearing adjust 500, 600, which may represent either the first 500 or the second eccentric bearing adjust 600.

FIG. 11A represents an eccentric bearing adjust in a starting state. FIG. 11B represents the eccentric bearing adjust in FIG. 11A after being adjusted. Specifically in this example, the tip set screw 510, 610 was tightened while the tip set screw 520, 620 was loosened. In practice, the amount and direction the tip set screws 510, 610, 520, 620 are adjusted depends on where the shaft and shaft gear being controlled need to be positioned to remove or mitigate the backlash.

FIG. 12 represents a diagram showing how the center of the shaft was moved from the starting position in FIG. 11A to the adjusted position in FIG. 11B. Moving the center of the shaft moves the gear on the shaft. In a preferred embodiment, this movement calibrates the shaft and gear so as to remove or mitigate the backlash between gears on different shafts.

In another embodiment (a single calibratable driving shaft 130 and a single driven shaft) of the invention, a gear box 100 may have a gear box housing 140 and a single driving shaft 130 with a driving shaft gear 300. The driving shaft 130 may be rotatably mounted in the gear box 100. The gear box 100 may also have a driven shaft having a driven shaft gear. The driven shaft is also rotatably mounted in the gear box 100 and positioned so that the driven shaft gear is in operable position with the driving shaft gear 300. The gear box 100 may also have an eccentric bearing adjust positioned so as to surround at least a portion of the driving shaft 130. A first tip set screw 510 and a second tip set screw 520 may be positioned in the gear box 100 housing in operable position juxtaposed next to the eccentric bearing adjust. The first tip set screw 510 and the second tip set screw 520 may be configured to calibrate a center position of the driving shaft 130 by rotating the eccentric bearing adjust to mitigate backlash between the driving shaft gear 300 and the driven shaft gear.

In another embodiment (a single driving shaft 130 and a single calibratable driven shaft) a gear box 100 may have a gear box housing 140 and a driving shaft 130 having a driving shaft gear 300. The driving shaft 130 is preferably rotatably mounted in the gear box 100. The gear box 100 may also have a driven shaft having a driven shaft gear. The driven shaft may be rotatably mounted in the gear box 100 so that the driven shaft gear is in operable position with the driving shaft gear 300. The gear box 100 may also have an eccentric bearing adjust positioned so as to surround at least a portion of the driven shaft. A first tip set screw 510 may be positioned in the gear box housing 140 in operable position juxtaposed next to the eccentric bearing adjust. A second tip set screw 520 position may be positioned in the gear box housing 140 in operable position juxtaposed next to the eccentric bearing adjust. The first tip set screw 510 and the second tip set screw 520 may be configured to calibrate a center position of the driven shaft by rotating the eccentric bearing adjust to mitigate backlash between the driving shaft gear 300 and the driven shaft gear.

In another example embodiment (a single calibratable driving shaft 130, a single calibratable driven shaft and a single non-calibratable driven shaft), a gear box 100 may have a gear box housing 140 that provides much of the strength and stability for the gear box 100 and forms an outer shell for the gear box 100.

The gear box 100 may also have a driving shaft 130 having a driving shaft gear 300. The driving shaft 130 may be rotatably mounted in the gear box 100. The gear box 100 may also have a first driven shaft 110 having a first driven shaft upper gear 310 and a second driven shaft lower gear. The first driven shaft 110 may be rotatably mounted in the gear box 100 so that the first driven shaft upper gear 310 is in operable position with the driving shaft gear 300.

The gear box 100 may also have a second driven shaft 120 having a second driven shaft gear 330. The second driven shaft 120 may be rotatably mounted in the gear box 100 so that the second driven shaft gear 330 is in operable position with the first driven shaft lower gear 320.

The gear box 100 may also have a first eccentric bearing adjust 500 positioned so as to surround and hold in place at least a portion of the driving shaft 130. A first tip set screw 510 and a second tip set screw 520 may be positioned in the gear box housing 140 in operable position juxtaposed next to the first eccentric bearing adjust 500. The first tip set screw 510 and the second tip set screw 520 may be configured to calibrate a center position of the driving shaft 130 by rotating the first eccentric bearing to mitigate backlash between the driving shaft gear 300 and the first driven shaft gear.

The gear box 100 may also have a second eccentric bearing adjust 600 positioned so as to surround at least a portion of the second driven shaft 120. A third and a fourth tip set screw 540 may be positioned in the gear box housing 140 in operable position juxtaposed next to the second eccentric bearing adjust 600. The third tip set screw 530 and the fourth tip set screw 540 may be configured to calibrate a center position of the second driven shaft 120 by rotating the second eccentric bearing to mitigate backlash between the first driven shaft lower gear 320 and the second driven shaft gear 330.

While the above example embodiment had one driving and two driven shafts and gears, the invention may be used with any number of driving and driven shafts and gears.

In some embodiments the first driven shaft 110 may be rotatably about its length axis but is otherwise fixed to the gear box housing 140.

In some embodiments the first and second eccentric bearing adjust 600 have a circular cavity for receiving the at least the portion of the driving shaft 130.

In some embodiments, the circular cavity of the first and second eccentric bearing adjust 600 has an original center point 1100 that moves to an adjusted center point 1150 at a different position than the original center point 1100 by tightening and loosening the first tip set screw 510 and the second tip set screw 520.

In some embodiments, a center point of the circular cavity of the first and second eccentric bearing adjusts 500, 600 may be offset from a center point of the eccentric bearing adjust. This moves a shaft inside the eccentric bearing adjust when the tip set screws for the eccentric bearing adjust are tightened or loosened. The movement of the shaft in the eccentric bearing adjust by the two tip set screws may be used to calibrate the location of the gears to mitigate or eliminate the backlash of the gears.

In some embodiments, the first and second eccentric bearing adjusts 500, 600 have a first flat surface for coming into contact with the first tip set screw 510 and a second different flat surface for coming into contact with the second tip set screw 520.

In some embodiments, a center point of the circular cavity of the eccentric bearing adjust is offset from a pivot point of the first and the second eccentric bearing adjusts 500, 600. The pivot point in this context is defined by the point where the first or second eccentric bearing adjust 500, 600 is pivoted around when the first tip set screw 510 and the second tip set screw 520 are tightened and loosened.

The inventions and methods described herein can be viewed as a whole, or as a number of separate inventions, that can be used independently or mixed and matched as desired. All inventions, steps, processed, devices, and methods described herein can be mixed and matched as desired.

All previously described features, functions, or inventions described herein or by reference may be mixed and matched as desired.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A gear box, comprising:
a gear box housing;
a driving shaft having a driving shaft gear, wherein the driving shaft is rotatably mounted in the gear box;
a driven shaft having a driven shaft gear, wherein the driven shaft is rotatably mounted in the gear box so that the driven shaft gear is in operable position with the driving shaft gear;
an eccentric bearing adjust positioned so as to surround at least a portion of the driving shaft;
a first tip set screw positioned in the gear box housing in operable position juxtaposed next to the eccentric bearing adjust;
a second tip set screw positioned in the gear box housing in operable position juxtaposed next to the eccentric bearing adjust; and
wherein the first tip set screw and the second tip set screw are configured to calibrate a center position of the driving shaft by rotating the eccentric bearing adjust to mitigate backlash between the driving shaft gear and the driven shaft gear, wherein the eccentric bearing adjust has a circular cavity for receiving the at least the portion of the driving shaft and the circular cavity of the eccentric bearing adjust has an original center point that moves to an adjusted center point by tightening and loosening the first tip set screw and the second tip set screw.

2. The gear box of claim 1, wherein the driven shaft is rotatably about its length axis but is otherwise fixed to the gear box housing.

3. The gear box of claim 1, wherein a center point of the circular cavity of the eccentric bearing adjust is offset from a center point of the eccentric bearing adjust.

4. The gear box of claim 1, wherein the eccentric bearing adjust has a first flat surface for coming into contact with the first tip set screw and a second different flat surface for coming into contact with the second tip set screw.

5. The gear box of claim 1, wherein a center point of the circular cavity of the eccentric bearing adjust is offset from a pivot point of the eccentric bearing adjust defined by where the eccentric bearing adjust is pivoted by adjusting the first tip set screw and the second tip set screw.

6. A gear box, comprising:
a gear box housing;
a driving shaft having a driving shaft gear, wherein the driving shaft is rotatably mounted in the gear box;
a driven shaft having a driven shaft gear, wherein the driven shaft is rotatably mounted in the gear box so that the driven shaft gear is in operable position with the driving shaft gear;
an eccentric bearing adjust positioned so as to surround at least a portion of the driven shaft;
a first tip set screw positioned in the gear box housing in operable position juxtaposed next to the eccentric bearing adjust;

a second tip set screw positioned in the gear box housing in operable position juxtaposed next to the eccentric bearing adjust; and
wherein the first tip set screw and the second tip set screw are configured to calibrate a center position of the driven shaft by rotating the eccentric bearing adjust to mitigate backlash between the driving shaft gear and the driven shaft gear, wherein the eccentric bearing adjust has a circular cavity for receiving the at least the portion of the driven shaft and the circular cavity of the eccentric bearing adjust has an original center point that moves to an adjusted center point by tightening and loosening the first tip set screw and the second tip set screw.

7. The gear box of claim 6, wherein the driving shaft is rotatably about its length axis but the driving shaft is otherwise fixed to the gear box housing.

8. The gear box of claim 6, wherein a center point of the circular cavity of the eccentric bearing adjust is offset from a center point of the eccentric bearing adjust.

9. The gear box of claim 6, wherein the eccentric bearing adjust has a first flat surface for coming into contact with the first tip set screw and a second different flat surface for coming into contact with the second tip set screw.

10. The gear box of claim 6, wherein a center point of the circular cavity of the eccentric bearing adjust is offset from a pivot point of the eccentric bearing adjust defined by where the eccentric bearing adjust is pivoted by adjusting the first tip set screw and the second tip set screw.

11. A gear box, comprising:
a gear box housing;
a driving shaft having a driving shaft gear, wherein the driving shaft is rotatably mounted in the gear box;
a first driven shaft having a first driven shaft upper gear and a second driven shaft lower gear, wherein the first driven shaft is rotatably mounted in the gear box so that the first driven shaft upper gear is in operable position with the driving shaft gear;
a second driven shaft having a second driven shaft gear, wherein the second driven shaft is rotatably mounted in the gear box so that the second driven shaft gear is in operable position with the first driven shaft lower gear;
a first eccentric bearing adjust positioned so as to surround at least a portion of the driving shaft;
a first tip set screw positioned in the gear box housing in operable position juxtaposed next to the first eccentric bearing adjust;
a second tip set screw positioned in the gear box housing in operable position juxtaposed next to the first eccentric bearing adjust;
wherein the first tip set screw and the second tip set screw are configured to calibrate a center position of the driving shaft by rotating the first eccentric bearing to mitigate backlash between the driving shaft gear and the first driven shaft gear;
a second eccentric bearing adjust positioned so as to surround at least a portion of the second driven shaft;
a third tip set screw positioned in the gear box housing in operable position juxtaposed next to the second eccentric bearing adjust;
a fourth tip set screw positioned in the gear box housing in operable position juxtaposed next to the second eccentric bearing adjust; and
wherein the third tip set screw and the fourth tip set screw are configured to calibrate a center position of the second driven shaft by rotating the second eccentric bearing to mitigate backlash between the first driven shaft lower gear and the second driven shaft gear, wherein the first eccentric bearing adjust has a circular cavity and the second eccentric bearing adjust has a circular cavity for receiving at least the portion of the driving shaft and at least the portion of the second driven shaft respectively and the circular cavity of the first eccentric bearing adjust has an original center point that moves to an adjusted center point by tightening and loosening the first tip set screw and the second tip set screw.

12. The gear box of claim 11, wherein the first driven shaft is rotatably about its length axis but the first driven shaft is otherwise fixed to the gear box housing.

13. The gear box of claim 11, wherein the first eccentric bearing adjust has a first flat surface for coming into contact with the first tip set screw and a second different flat surface for coming into contact with the second tip set screw.

14. The gear box of claim 11, wherein a center point of the circular cavity in the first eccentric bearing adjust is offset from a pivot point of the first eccentric bearing adjust defined by where the first eccentric bearing adjust is pivoted by adjusting the first tip set screw and the second tip set screw.

* * * * *